United States Patent [19]

Hill

[11] 3,898,222

[45] Aug. 5, 1975

[54] PROCESS FOR PREPARING TRICHLOROISOCYANURIC ACID

[75] Inventor: Howard W. Hill, Concord, Calif.

[73] Assignee: The Dow Chemical Company, Midland, Mich.

[22] Filed: July 5, 1974

[21] Appl. No.: 485,872

[52] U.S. Cl. .................. 260/248 C; 252/187 C
[51] Int. Cl. ............................. C07d 55/40
[58] Field of Search ..................... 260/248 C

[56] References Cited
UNITED STATES PATENTS
3,757,018   9/1973   Mesiah................ 260/248

Primary Examiner—John M. Ford
Attorney, Agent, or Firm—Gary D. Street

[57] ABSTRACT

The invention comprises a method for preparing trichloroisocyanuric acid by reacting an aqueous solution of a trialkali metal cyanurate with an excess of chlorine in the presence of a solvent for the resulting trichloroisocyanuric acid, said solvent being essentially water immiscible. The process is carried out completely in the liquid phase.

3 Claims, No Drawings

PROCESS FOR PREPARING TRICHLOROISOCYANURIC ACID

BACKGROUND OF THE INVENTION

Trichloroisocyanuric acid is a sanitizing and bleaching agent used in cleaners and bleaches, and is a substitute for elemental chlorine in swimming pools. It has generally been prepared by processes involving a solid phase. For instance, a solution of alkali cyanurate salt is fed to a reactor to produce a slurry effluent, or a slurry of a cyanuric acid salt is fed to produce again a slurry effluent.

The invention described herein is an improvement over prior art processes in that there is a total absence of solid phases in the chlorination reactor which results in positive benefits in the following process particulars.

Control of reaction temperatures in known solid phase processes has been especially difficult. The presence of said phase not only reduces the effective thermal conductivity of the fluid to be cooled, but since the existence of the solid phase denotes a saturated solution in the liquid phase, deposition of the solute occurs on the cooling surfaces through which heat is removed, thereby significantly reducing the heat exchange ability of said surfaces. The disclosed all-liquid phase process, on the other hand, not only avoids solids deposition on cooling surfaces, but, as a result of the additional heat capacity of the acid solvent, provides a system which does not normally require further cooling after preparation of the feed solutions.

Another disadvantage of existing processes containing solid reactants is the presence of concentration gradients, which are unavoidable at solid-liquid interfaces. Said interface acts as a diffusion barrier which limits transfer of chlorine into the interior of the particle, thereby greatly increasing the time necessary for complete chlorination of the acid salt. Such barriers do not exist in an all-liquid system.

In addition to concentration gradients, thermal gradients also exist in a solid-liquid system, particularly at the point where chlorine gas is introduced to the aqueous slurry. The result is localized overheating to such an extent that some decomposition of the cyanurate ring occurs, resulting in the formation of nitrogen trichloride in amounts which are hazardous, as well as uneconomical from the standpoint of desired product.

The liquid-liquid process, as more particularly taught below, results in very short reaction times when good reactant mixing occurs. Production of nitrogen trichloride has been found to be low, generally representing less than 0.5 percent of the equivalent cyanurate feed. Said amount poses no hazard problem, and is economically negligible.

A still further drawback to existing solid-liquid processes resides in the recovery of the chlorinated product from the process slurry. Generally a sequence comprising filtration, washing and subsequent drying using heat and vacuum is used. A major problem resulting from said sequence is the instability of trichloroisocyanuric acid in the presence of brine or moisture. Unless NaCl is thoroughly washed from the impure solid product, a product degradation reaction occurs which may be represented by the following equation:

$$NaCl + Cl_3(CNO)_3 \rightleftharpoons Cl_2 + NaCl_2(CNO)_3$$

Even in the absence of NaCl, trichloroisocyanuric acid is prone to decompose in the presence of moisture, particularly at elevated temperatures, according to the following:

$$H_2O + Cl_3(CNO)_3 \rightleftharpoons HClO + HCl_2(CNO)_3$$

$$2HClO \rightleftharpoons H_2O + ClO_2$$

Both of the above two decompositions result in the loss of chlorine values from the desired highly chlorinated product unless product drying is done at reduced temperatures or in the presence of excess chlorine. However, the liquid-liquid reaction of the present invention, as will be seen, results in a salt-free solution of trichloroisocyanuric acid. Further, preliminary evaporation removes dissolved chlorine and water. In the absence of these two substances, the above deleterious reaction does not occur. The result, generally, is a dry product of 90 percent or greater equivalent chlorine content.

SUMMARY OF THE INVENTION

In accordance with the present invention, then, trichloroisocyanuric acid is prepared by reacting an aqueous solution of a trialkali metal cyanurate with an excess of chlorine in the presence of a solvent for the resulting trichloroisocyanuric acid, said solvent being essentially water immiscible, essentially inert.

All of the starting materials for the process of this invention are commercially available, the trialkali metal cyanurates normally being prepared by reacting cyanuric acid with, for example, sodium or potassium hydroxide. Sufficient base is utilized to insure complete conversion of the acid to the trialkali metal salt, the resulting salt being dissolved in enough water to remain in solution during the chlorination reaction. Normally 3 to 3.5 moles of base per mole of cyanuric acid is sufficient.

Chlorine and a water-immiscible solvent for the resultant trichloroisocyanuric acid may be introduced to the reactor independently, or they may be premixed prior to introduction. It is required that an excess over the stoichiometric amount of chlorine, i.e., greater than 3 moles per mole of the salt, is maintained in the reactor. Normally, more than about 4.0 moles is uneconomical.

The trichloroisocyanuric acid solvent must be water-immiscible in order to insure distinct organic/aqueous phases, and it also must not detrimentally react with the acid. Suitable solvents include methylene chloride, benzene, symmetrical tetrachloroethane, trichloroethylene, pentachloroethane and ethylene dichloride. Methylene chloride and ethylene dichloride are preferred.

The organic phase will normally consist of the solvent, trichloroisocyanuric acid and excess chlorine. The aqueous phase will include alkali metal cyanurate, chloride and hypochlorite, and possibly some dichloroisocyanurate salts.

The reaction temperature should be maintained between the freezing point of the aqueous phase or solvent, whichever is higher, and about 50°C. Higher temperatures may be used in pressurizable equipment. Generally a temperature from about 10°–50°C. and a pressure of about 1 atmosphere is preferred, although superatmospheric pressures may be utilized.

The reaction is very fast, the rate being a function of the interfacial area between the two phases, which depends primarily upon mixing intensity. The minimum contact time necessary in order to insure complete reaction under a particular set of conditions can readily be determined by the skilled in the art.

The process can either be batch or continuous. The resulting trichloroisocyanuric acid and the organic solvent may be separated by known techniques such as evaporation or low temperature crystallization and filtration or centrifugation. One peripheral benefit of the process of this invention is that the resulting crystals of trichloroisocyanuric acid need not be washed or further purified. A very high purity product is made by this method due to the fact that the co-produced sodium chloride is insoluble in the solvent, as is dichloroisocyanuric acid and its salts. These are the most difficult to separate contaminants in other processes, and also may contribute to decomposition of the acid product, as was detailed above.

SPECIFIC EXAMPLES

EXAMPLE 1

Chlorine gas was bubbled into 900 ml. of cold methylene chloride until the weight gain of the solution was 34 grams (0.479 moles). To ensure that no photochemical reaction between the chlorine and methylene chloride occurred, the methylene chloride was cooled and was first saturated with air. Temperature of the chloride solution was about 15°C.

A solution of trisodium salt of cyanuric acid was prepared by dissolving 14.1 grams (0.109 moles) of 99% cyanuric acid prills in 176 ml. of 1.953 normal NaOH solution. During addition of the cyanuric acid, the flask containing the sodium hydroxide solution was surrounded by an ice bath and was stirred magnetically. Temperature of the final solution was approximately 15°C.

The chlorine solution was poured into a glass kettle with 1,200 ml. capacity. The kettle, which was 4 inches D. and 7 inches deep, had four vertical indentations which served as baffles, and was equipped with a 4-blade turbine agitator. A glass thermocouple well and a combination pH probe were also provided.

The aqueous solution was poured in carefully so that it floated on top of the denser chlorine/methylene chloride solution. No evidence of reaction was noted. The 2 inch diameter agitator was then started at about 600 rpm producing an intimate and uniform suspension of aqueous spheres in the organic phase. After 10 minutes stirring, the agitator was stopped and the suspension rapidly separated, giving a clear yellow organic phase and a slightly cloudy aqueous phase. The final temperature was 21°C. The organic phase (890 ml.), weighing 1185.3 grams, was decanted off. A 100 ml. aliquot weighing 132.2 grams was placed in an evaporator dish and evaporated to a "mush" on a hot plate. Final drying was done in a vacuum oven. Solids obtained weighed 2.58 grams. Based on this aliquot, total solids yield was 23 grams. A portion of the dried solids was titrated as 91.3 percent "available" chlorine, which compares to 91.52 percent "available chlorine" for trichloroisocyanuric acid. The yield of trichloroisocyanuric acid was 92 percent of theory.

EXAMPLE 2

This experiment was intended to simulate a countercurrent two-stage reaction in which the organic phase from the second stage reaction is used to contact the trisodium cyanurate solution in the first stage, and the aqueous phase from the final stage is contacted with the solvent recycle and feed chlorine.

Aqueous trisodium cyanurate solution made by dissolving 16.66 grams (0.129 moles) of 99% cyanuric acid in 205 ml. of 1.982 normal sodium hydroxide solution was added to the reactor which consisted of a flanged glass resin kettle 4 inches diameter by 6 inches high cylinder having four vertical hemicylindrical indentations on the perimeter to serve as baffles, and a bottom connection with stopcock for draining and filling. The matching flanged glass lid was filled with an axial glass stirring shaft with a 4-blade Teflon turbine type impeller, a thermowell, a pH probe and a vapor vent connection.

A solution, in 700 ml. of ethylene dichloride, of 4.9 grams (0.02 moles) of trichloroisocyanuric acid and 34.4 grams (0.49 moles) of chlorine was added carefully to the bottom of the reactor without mixing. The two liquids were at an ambient temperature of 25°C. and the pH of the aqueous phase was 13.2. When the agitator was started at 820 RPM, the temperature rapidly rose to 34°C. and the pH fell rapidly to 4.7. After 5½ minutes, when the pH had dropped to 4.4, the agitator was stopped and the two phases rapidly separated.

The heavy organic phase was drained from the reactor. It was found to consist of 28.9 grams (0.124 moles) of trichloroisocyanuric acid, 7.2 grams of unreacted chlorine and 877 grams of solvent. To the aqueous solution remaining in the reactor a solution of 27.5 grams (0.388 moles) of chlorine in 748 grams (7.56 moles) of ethylene dichloride was added and the agitator was restarted and was run for five minutes. The pH of the aqueous phase had dropped to 3.2 and the temperature of the liquids were 28°. The heavy organic phase was drained. It was found to consist of 24.9 grams (0.351 moles) of unreacted chlorine, 4.62 grams (0.02 moles) of trichloroisocyanuric acid and 750 grams of solvent. The remaining aqueous phase (216 ml.) contained, in addition to sodium chloride, 0.26 grams of available chlorine as NaOCl.

A sample of trichloroisocyanuric acid product, obtained by evaporating the first-stage organic solution, was found to contain 91.5% available chlorine, which is equal to the theoretical value for 100% trichloroisocyanuric acid.

I claim:

1. A process for preparing trichloroisocyanuric acid by reacting an aqueous solution of a trialkali metal cyanurate with an excess of chlorine in the presence of an essentially water immiscible solvent for the resulting acid.

2. The process of claim 1 wherein the acid solvent is selected from the group comprising methylene chloride, benzene, symmetrical tetrachloroethane, trichloroethylene, pentachloroethane and ethylene dichloride.

3. The process of claim 1 wherein the reaction is maintained between the freezing point of the aqueous phase and about 50°C.

* * * * *